(12) United States Patent
Baldwin et al.

(10) Patent No.: US 7,595,073 B2
(45) Date of Patent: Sep. 29, 2009

(54) USE OF SIDEROPHORES AND ORGANIC ACIDS TO RETARD LIPID OXIDATION

(75) Inventors: Cheryl Baldwin, Mundelein, IL (US);
Ahmad Akashe, Mundelein, IL (US);
Robert Dinwoodie, Glenview, IL (US);
Rathna Koka, Mt. Prospect, IL (US);
Leslie G. West, Glencoe, IL (US); Olaf Kortum, Neubiberg (DE)

(73) Assignee: Kraft Foods Global Brands LLC, Northfield, IL (US)

( * ) Notice: Subject to any disclaimer, the term of this patent is extended or adjusted under 35 U.S.C. 154(b) by 488 days.

(21) Appl. No.: 10/376,030

(22) Filed: Feb. 28, 2003

(65) Prior Publication Data

US 2004/0170728 A1  Sep. 2, 2004

(51) Int. Cl.
*C11B 5/00* (2006.01)

(52) U.S. Cl. ................................ 426/541; 426/601

(58) Field of Classification Search ................ 426/531, 426/541, 542, 544, 601, 654
See application file for complete search history.

(56) References Cited

U.S. PATENT DOCUMENTS

| | | | |
|---|---|---|---|
| 4,525,306 A | 6/1985 | Yajima | |
| 4,587,240 A | 5/1986 | Hider et al. | |
| 4,626,416 A * | 12/1986 | DeVoe et al. ................ | 423/12 |
| 4,666,927 A | 5/1987 | Hider et al. | |
| 4,872,899 A | 10/1989 | Miller | |
| 4,895,725 A | 1/1990 | Kantor et al. | |
| 4,912,118 A | 3/1990 | Hider et al. | |
| 5,047,251 A | 9/1991 | Spencer | |
| 5,120,556 A | 6/1992 | Fujimoto et al. | |
| 5,166,375 A | 11/1992 | Kameoka et al. | |
| 5,192,807 A | 3/1993 | Gysin et al. | |
| RE34,313 E | 7/1993 | Hider et al. | |
| 5,371,234 A | 12/1994 | Hancock | |
| 5,393,777 A | 2/1995 | Crosa | |
| 5,514,407 A | 5/1996 | Perlman et al. | |
| 5,552,167 A | 9/1996 | Taylor et al. | |
| 5,554,507 A | 9/1996 | Grossman et al. | |
| 5,573,801 A | 11/1996 | Wilhoit | |
| 5,624,703 A | 4/1997 | Perlman et al. | |
| 5,851,578 A | 12/1998 | Gandhi | |
| 5,871,757 A | 2/1999 | Cloughley et al. | |
| 5,874,117 A | 2/1999 | Sundram et al. | |
| 6,013,647 A | 1/2000 | Heinisch et al. | |
| 6,033,706 A | 3/2000 | Silkeberg et al. | |
| 6,162,480 A | 12/2000 | van Buuren et al. | |
| 6,165,539 A | 12/2000 | Erasmus et al. | |
| 6,287,579 B1 | 9/2001 | Kleiman et al. | |
| 6,310,058 B1 | 10/2001 | Miller et al. | |
| 6,448,292 B2 | 9/2002 | Koide et al. | |

OTHER PUBLICATIONS

Braun, Volkmar and Winkelmann, Günther, "Microbial Iron Transport Structure and Function of Siderophores," Progress in Clinical Biochemistry and Medicine, Springer-Verlag Berlin Heidelberg, 1987, vol. 5, cover and pp. 67-99.

Carrano, Carl J. and Raymond, Kenneth N., "Coordination Chemistry of Microbial Iron Transport Compounds: Rhodotorulic Acid and Iron Uptake in *Rhodotorula pilimanae*," Journal of Bacteriology, Oct. 1978, vol. 136, No. 1, pp. 69-74.

Neilands, J. B., "Microbial Iron Compounds," Annual Reviews in Biochemistry, 1981, vol. 50, pp. 715-731.

Rachidi, Samar, Coudray, Charles, Baret, Paul, Gelon, Gisele, Pierre, Jean Louis, and Favier, Alain, "Inhibition of Lipid Peroxidation by a New Family of Iron Chelators," Biological Trace Element Research, 1994, vol. 41, pp. 77-87.

* cited by examiner

*Primary Examiner*—Leslie Wong
(74) *Attorney, Agent, or Firm*—Fitch, Even, Tabin & Flannery

(57) ABSTRACT

The present invention provides methods for retarding lipid oxidation in food products. More specifically, this invention relates to the use of antioxidant compositions containing effective amounts of siderophores and organic acids to retard lipid oxidation in food products. The present invention also relates to food products containing such lipid oxidation-retarding compositions.

26 Claims, No Drawings

USE OF SIDEROPHORES AND ORGANIC ACIDS TO RETARD LIPID OXIDATION

FIELD OF THE INVENTION

The present invention generally relates to a process for retarding lipid oxidation in food products. More specifically, this invention relates to the use of compositions containing effective amounts of siderophores and organic acids to retard lipid oxidation in food products.

BACKGROUND OF THE INVENTION

Oxidation adversely effects nearly all edible fats and oils (i.e., lipids), as well as food products containing such fats and oil. Oxidation of such fats and oils in food products generally results in significant and undesirable changes in flavor, aroma, color, or other organoleptic properties.

Some fats and oils are especially susceptible to oxidation. For example, food products containing significant levels of polyunsaturated fatty acid functional oils such as omega-3-containing fish oils often have reduced shelf lives due to the oxidation of the oils. In addition to the undesirable changes in flavor, aroma, color, and other organoleptic properties, oxidation often reduces the beneficial effects associated with such functional oils in the human diet.

A large number of efforts have been made to increase the oxidative stability of fats and oils used in food products. For example, U.S. Pat. No. 4,525,306 (Jun. 25, 1985) provided various antioxidant compositions which were derived from herb spices to increase the oxidative stability of fats and oils; stability could be further increased by providing soft capsules for fats or oils containing the antioxidant compositions. U.S. Pat. No. 4,895,725 (Jan. 23, 1990) provided microencapsulated fish oil wherein unpleasant taste and smell as well as oxidation were inhibited. U.S. Pat. No. 5,120,556 (Jun. 9, 1992) provided a method for inhibiting lipid oxidation wherein a defatted corn germ composition was added to an unsaturated fat or oil or a food product containing such unsaturated fat or oil.

U.S. Pat. No. 5,166,375 (Nov. 24, 1992) provided an antioxidant composition comprising musizin and tocopherol for use in fats and oils. U.S. Pat. No. 5,514,407 (May 7, 1996) and U.S. Pat. No. 5,624,703 (Apr. 29, 1997) provided a blend of a cholesterol-reduced animal fat and a vegetable or cholesterol-stripped fish oil having specific ratios of linoleic acid and myristic acid; such compositions are reportedly oxidatively stable. U.S. Pat. No. 5,552,167 (Sep. 3, 1996) reported that high linolenic edible oils (e.g., soybean oil, canola) can be oxidatively stabilized by the addition of effective amounts of rice bran oil. U.S. Pat. No. 5,871,757 (Feb. 16, 1999) stabilized polyunsaturated oils against oxidation by the addition of an essential oil such as thyme oil, pepper oil, or clove oil.

U.S. Pat. No. 5,874,117 (Feb. 23, 1999) provided an oxidation-resistant food shortening including a blended vegetable fat composition having between 50 and 95 percent palm fat and between 5 and 50 percent corn oil. U.S. Pat. No. 6,033,706 (Mar. 7, 2000) provided a refining method wherein crude edible speciality oils could be prepared while minimizing the destruction of natural antioxidants and antioxidant precursors naturally contained in the starting oils. U.S. Pat. No. 6,162,480 (Dec. 19, 2000) incorporated polyphenols in oils to provide oxidative stability; the polyphenols were incorporated by soaking olive fruits in the oil for at least one day. U.S. Pat. No. 6,165,539 (Dec. 16, 2000) reduced oxidation of food supplements containing oils by preparing and/or storing the food supplements under controlled lighting conditions and/or low-oxygen conditions.

U.S. Pat. No. 6,287,579 (Sep. 11, 2001) used an antioxidant composition containing at least one tocopherol and an acid selected from the group consisting of kojic acid, malic acid, and ascorbic acid in esters of long-chain organic molecules derived from natural oils (e.g., plant, bean, seed, and nut oils). U.S. Pat. No. 6,448,292 (Sep. 10, 2002) provided an oxidatively stable oil composition containing a diglyceride and a triglyceride, wherein the diglyceride has at least 55 percent of the acyl groups being unsaturated acyl groups and 15 to 100 percent of the acyl groups being omega-3 type unsaturated acyl groups having at least 20 carbon atoms and wherein the triglyceride has at least 70 percent of the acyl groups being unsaturated acyl groups and 5 to 80 percent of the acyl groups are linoleyl groups.

Lactobionic acid (4-O-β-D-galactopyranosyl-D-gluconic acid; CAS Reg. No. 96-82-2) is a water soluble, white crystalline compound. It can be synthesized from lactose by oxidation of the free aldehyde group in lactose as carried out catalytically, chemically, electrolytically, or enzymatically. Harju, *Bulletin of the IDF* 289, ch. 6., pp. 27-30, 1993; Satory et al., *Biotechnology Letters* 19 (12) 1205-08, 1997. The use of lactobionic acid or its salts as additives in food products previously has been suggested for several specific applications. Calcium or iron chelate forms of lactobionic acid have been described for dietary mineral supplementation. Riviera et al., *Amer. J. Clin. Nutr.;* 36 (6) 1162-69, 1982. U.S. Pat. No. 5,851,578 describes a clear beverage having a non-gel forming fiber, and water soluble salts of calcium, with or without water soluble vitamins, with or without additional mineral salt supplements and buffered with food acids. The food acid buffering agent includes citric, lactic, maleic, adipic, succinic, acetic, acetic gluconic, lactobionic, ascorbic, pyruvic, and phosphoric acids, as well as combinations thereof. Calcium lactobionate, a salt form of lactobionic acid, has been approved for use as a firming agent in dry pudding mixes. 21 C.F.R. §172.720 (1999). Also, the possible use of lactobionic acid as a general food acidulent has been proposed, albeit without exploration or illustration. Timmermans, *Whey: Proceedings of the 2nd Int'l Whey Conf.*, Int'l Dairy Federation, Chicago, October 1997, pp. 233, 249. This article generally describes lactobionic acid as being useful as an antibiotics carrier, an organ transplant preservative, mineral supplementation, growth promotion of bifidobacteria, or as a co-builder in detergents in its K-lactobionate salt form.

Siderohores are, in general terms, iron chelating agents which are expressed by microorganisms such as yeasts and molds (especially in low iron environments). Microorganisms use such siderophores to obtain iron necessary for growth. Typically, siderophores have been used for deferration therapy (i.e., treating patients with excessive iron loads) and/or as an anti-microbial treatment. See, e.g., U.S. Pat. No. 5,192,807 (Mar. 9, 1993); U.S. Pat. No. 5,371,234 (Dec. 6, 1994); U.S. Pat. No. 5,393,777 (Feb. 28, 1995); U.S. Pat. No. 6,013,647 (Jan. 11, 2000). U.S. Pat. No. 5,573,801 (Nov. 12, 1996) used antimicrobial compositions containing a lanthionine bacteriocin (e.g., nisin) in combination with a chelating agent (including certain siderophores such as des-ferri-ferrichrysin) as a surface coating for food products. Siderophores have also been reported for use in treatment of iron deficiency anaemia in both humans and animals (U.S. Pat. RE. 34,313 (Jul. 13, 1993)) and of iron chlorosis in plants (U.S. Pat. No. 4,872,899 (Oct. 10, 1989)).

There remains a need, however, for different methods to increase the oxidative stability of fats and oils which are to be included in food products. There also remains a need for antioxidant compositions which can be used in food compositions to increase oxidative stability. There also remains a need for methods to increase the oxidative stability of fats and oils which are to be included in food products using antioxidant compositions containing only natural or non-synthetic ingredients. There also remains a need for antioxidant compositions containing natural or non-synthetic ingredients which can be used in food compositions to increase oxidative stability. The present invention provides such methods and compositions.

SUMMARY OF THE INVENTION

The present invention generally relates to a process for retarding lipid oxidation in food products. More specifically, this invention relates to the use of compositions containing effective amounts of siderophores and organic acids to retard lipid oxidation in food products. The present invention also relates to food products containing such lipid oxidation-retarding compositions.

The present invention provides a method for retarding oxidation of a lipid in a lipid-containing food product, said method comprising adding an effective amount of an antioxidant composition (1) to the lipid before forming the lipid-containing food product or (2) to the lipid containing-food product, wherein the antioxidant composition comprises effective amounts of a siderophore and an edible organic acid. More preferably, the method employs an antioxidant composition consisting essentially of effective amounts of a siderophore and an edible organic acid.

The present invention also provides a method for retarding oxidation of a lipid, said method comprising adding an effective amount of an antioxidant composition to the lipid, wherein the antioxidant composition comprises effective amounts of a siderophore and an edible organic acid.

The present invention also provides an antioxidant composition effective for retarding lipid oxidation, said composition comprising effective amounts of a siderophore and an edible organic acid. More preferably, the antioxidant composition consists essentially of effective amounts of a siderophore and an edible organic acid.

The present invention also provides a lipid-containing food product which is resistant to lipid oxidation, said food product containing a lipid and an effective amount of an antioxidant composition, wherein the antioxidant composition comprises effective amounts of a siderophore and an edible organic acid. More preferably, the food product contains an antioxidant composition consisting essentially of effective amounts of a siderophore and an edible organic acid.

Such antioxidant compositions may be added to the lipid or food product or may be formed in situ by separately adding effective amounts of the siderophore and the edible organic acid to the lipid or food product. For purposes of this invention and the claims, these alternative methods (i.e., direct addition of the antioxidant composition to the lipid or food product or the in situ formation of the antioxidant composition within the lipid or food product) are considered equivalent.

DETAILED DESCRIPTION OF THE INVENTION

The present invention generally relates to retarding lipid oxidation in food products. More specifically, this invention relates to the use of compositions containing effective amounts of siderophores and organic acids to retard lipid oxidation in food products. The present invention also relates to food products containing such lipid oxidation-retarding compositions.

The oxidation of lipids, whether alone or present within a food product, can be significantly retarded by the addition of an antioxidant composition containing effective amounts of a siderophore and an edible organic acid. Generally, the antioxidant composition contains about 0.1 to about 75 percent of the siderophore and about 25 to about 99.9 percent of the edible organic acid. More preferably, the antioxidant composition contains about 5 to about 25 percent of the siderophore and about 75 to about 95 percent of the edible organic acid. Generally, the antioxidant composition is added to the lipid product at levels of about 0.01 to about 10 percent and more preferably of about 0.25 to about 4 percent. As noted, the various components of the antioxidant composition can be added directly to the lipid or food product for in situ formation of the antioxidant composition within the lipid or food product. For such in situ formation of the antioxidant composition, the relative amounts of the siderophore and the edible organic acid to be added to the lipid or food product should be such that the antioxidant composition formed within the lipid or food product contains about 0.1 to about 75 percent of the siderophore and about 25 to about 99.9 percent of the edible organic acid, more preferably, about 5 to about 25 percent of the siderophore and about 75 to about 95 percent of the edible organic acid, and that the antioxidant composition is present in the lipid product at levels of about 0.01 to about 10 percent and more preferably of about 0.25 to about 4 percent.

The antioxidant compositions of this invention are especially useful in improving the oxidation stability of unsaturated lipids. Examples of lipids for which the antioxidant compositions of this invention can be added include fish oil, other omega-3- or omega-6-containing oils, flax seed oil, soybean oil, olive oil, corn oil, sesame seed oil, peanut oil, grape seed oil, almond oil, cashew oil, other nut and seed oils, partially saturated oils, butter fat, essential oils, and the like as well as mixtures thereof. The antioxidant compositions of this invention can also be added to purified fractions or components of these oils.

The oxidatively stabilized fats and oils of this invention can be used in a variety of food products. The oxidatively stabilized lipids (i.e., lipids containing the antioxidant composition) can be added directly to the food products or can be prepared in situ by adding the lipids and antioxidant composition separately to the food product. Alternatively, the various components of the antioxidant composition can be added directly to the lipid or food product for in situ formation of the antioxidant composition within the lipid or food product. Especially preferred food products containing the oxidatively stabilized lipids of this invention include emulsified food products such as, for example, mayonnaise, salad dressing, and the like. Generally, the amount of oxidatively stabilized lipid added to the food product, as well as the manner of adding it, is essentially the same for the corresponding food product containing non-stabilized lipid or conventionally stabilized lipid (e.g., EDTA stabilized lipid).

Siderophores suitable for use in the present invention generally have at least one hydroxamate group and are generally derived or isolated from fungi, yeast, and catechols from bacteria. These siderophores are generally very soluble in water and relatively low in molecular weight (generally molecular weights of about 300 to 1000 g/mole).

Suitable siderophores for use in the present invention include, for example, rhodotorulic acid, dimerumic acid, enterobactin, pseudobactin, nocardamine, schizokinen, parabeactin, azotochelin, mycobactin, pyochelin, pyoverdin, ferrichrysin, ferrishrome, coprogen, desferoxamine, other acid-tolerant siderophores, and the like as well as salts thereof and mixtures thereof. Of course, the siderophore salts should be edible and suitable for use in a food product. The preferred siderophore used in the present invention is rhodotorulic acid which has the following structure:

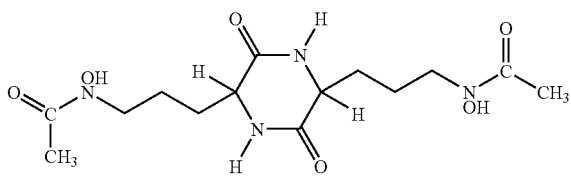

Rhodotorulic acid can be isolated from a culture of red yeast known as *Rhodotorula pilimanae*. The yeast is grown in an iron-deficient liquid medium and excretes large quantities of a secondary hydroxamic acid, commonly known as rhodotorulic acid. Methods of producing rhodotorulic acid from this strain of red yeast are well known. See, e.g., Atkin et al., "Rhodotorulic Acid, a Diketopiperazine Dihydroxamic Acid with Growth-Factor Activity: I. Isolation and Characterization," *Biochemistry*, 7, 3734 (1968). Once production of rhodotorulic acid is complete, the yeast may be precipitated by centrifugation, after which the rhodotorulic acid can be collected from the supernatant liquid by evaporation and preferably purified by crystallization.

Suitable edible organic acids for use in the present invention include lactobionic acid, lactic acid, citric acid, acetic acid, lactic acid, malic acid, gluconic acid, ascorbic acid, tartaric acid, fumaric acid, succinic acid, and the like as well as mixtures thereof; salts of such acids can also be used in combination with the free acids. For purposes of this invention, the terms "lactobionic acid" and "gluconic acid" are also intended to include their lactones as well as mixtures of the respective acids and their lactones. Preferred edible organic acids include lactobionic acid, lactic acid, citric acid, acetic acid. Lactobionic acid is the most preferred edible organic acid for use in the present invention.

Lactobionic acid may be obtained commercially (e.g., Lonza Inc., Fairlawn, N.J.; Sigma, St. Louis, Mo.) or prepared through chemical or enzymatic oxidation of lactose or a lactose-containing substrate. A particularly suitable enzyme for lactose oxidation has been developed by Novozymes A/S and is described in Patent WO 9931990, which is hereby incorporated by reference. Cellobiose dehydrogenase is also a useful enzyme for converting lactose to lactobionic acid. Canevascini et al., *Zeitschrift fur Lebensmittel Untersuchung und Forschung*, 175: 125-129 (1982). Glucose-fructose oxidoreductase can also be used if desired. The use of glucose-fructose oxidoreductase to oxidize lactose results in two products, sorbitol and lactobionic acid, and a further separation procedure is necessary to recover the lactobionic acid product. Nidetzky et al., *Biotechnology and Bioengineering*, Vol. 53 (1997). Other methods of generating lactobionic acid known in the art can also be used.

The present invention provides a method for retarding oxidation of producing lipids, especially lipids containing unsaturation, and thus producing lipids having significantly improved oxidation stability. For example, and as illustrated in Example 1, the addition of 0.5 percent rhodotorulic acid and 0.5 percent lactobionic acid to fish oil and flax oil emulsions provided significant increases in oxidative stability as measured using an Oxidative Stability Analyzer (OSA) relative to control samples containing no preservatives or to control samples containing conventional levels of EDTA. Moreover, the oxidation stability of the oils containing a combination of siderophores and edible organic acids was significantly greater than corresponding oils containing either the siderophore or the edible organic acid alone. Indeed, merely adding the edible organic acid alone was generally less effective than conventional EDTA treatment. Thus, the synergistic effect between the siderophore and the edible organic acid is even more surprising. For purposes of this invention, a "significant improvement in oxidative stability" for a lipid is an improvement of at least about 50 percent, preferably at least about 75 percent, and more preferably at least about 100 percent as compared to the lipid containing about 0.1 percent EDTA stabilizer.

Having generally described the embodiments of the process illustrated in the figures as well as other embodiments, the invention will now be described using specific examples which further illustrate various features of the present invention but are not intended to limit the scope of the invention, which is defined in the appended claims. All percentages used herein are by weight, unless otherwise indicated. All references cited herein are incorporated by reference.

EXAMPLE 1

To determine the influence of potential preservatives on the stability of oil, a model emulsion system was used and analyzed with an Oxidative Stability Analyzer (OSA; Omnion Inc., Rockland, Mass.). OSA accelerates oil oxidation with the addition of oxygen and heat and measures the onset of oxidation (i.e., the induction time). Previous experiments have confirmed that the results obtained with OSA are comparable to traditional fat oxidation tests.

Various polyunsaturated oils, including fish oil, flax oil, and soybean oil, were tested in aqueous emulsions. Emulsions were prepared by combining about 10 percent of the oil of interest, about 0.3 percent polysorbate 60, and water and homogenizing under high shear. Rhodotorulic acid (RA) was the siderophore used in these evaluations. The edible organic acids tested included lactobionic acid, lactic acid, citric acid, and acetic acid. The siderophore and/or organic acids were added to the emulsions at the levels indicated below; OSA measurements were made at about 60° C. Controls also included a sample without any preservative as well as a sample containing disodium-EDTA at its current maximum allowable level (about 0.01 percent).

The results for emulsions prepared with fish oil, flax oil, and soybean oil are presented below in Tables I-III, respectively. Overall, the results indicate that rhodotorulic acid has the potential to replace EDTA and to stabilize lipid-containing products, especially polyunsaturated lipids, such as salad dressings. In fact, rhodotorulic acid in the flax and soybean emulsions stabilized the oil longer than EDTA. Combinations of organic acids and rhodotorulic acid provided a surprising increase in stability.

TABLE I

Fish Oil (Average of Duplicate Samples)

| Sample | Induction Time (hrs) |
| --- | --- |
| No preservative | 6.0 |
| 0.01% EDTA | 46.5 |
| 0.5% Rhodotorulic Acid | 49.6 |
| 0.25% Rhodotorulic Acid | 36.5 |
| 2% Lactobionic Acid | 25.0 |
| 4% Lactobionic Acid | 25.0 |
| 2% Lactobionic Acid + 0.25% Rhodotorulic Acid | 63.8 |

TABLE I-continued

Fish Oil (Average of Duplicate Samples)

| Sample | Induction Time (hrs) |
|---|---|
| 4% Lactobionic Acid + 0.25% Rhodotorulic Acid | 70.0 |
| 2% Lactobionic Acid + 0.5% Rhodotorulic Acid | 98.5 |
| 4% Lactobionic Acid + 0.5% Rhodotorulic Acid | 87.0 |
| 2% Citric Acid | 34.0 |
| 1% Citric Acid + 0.5% Rhodotorulic Acid | 75.0 |
| 2% Citric Acid + 0.5% Rhodotorulic Acid | 90.0 |

TABLE II

Flax Oil (Average of Duplicate Samples)

| Sample | Induction Time (hrs) |
|---|---|
| No preservative | 6 |
| 0.01% EDTA | 45 |
| 0.5% Rhodotorulic Acid | 87 |
| 0.25% Rhodotorulic Acid | 77 |
| 4% Lactobionic Acid | 26 |
| 4% Lactobionic Acid + 0.5% Rhodotorulic Acid | 105 |
| 4% Lactobionic Acid + 0.25% Rhodotorulic Acid | 104 |
| 2% Citric Acid | 42 |
| 2% Citric Acid + 0.5% Rhodotorulic Acid | 127 |
| 1% Lactic Acid | 24 |
| 2% Citric Acid + 0.5% Rhodotorulic Acid | 116 |
| 0.3% Acetic Acid + 0.5% Rhodotorulic Acid | 100 |

TABLE III

Soybean Oil (Average of Duplicate Samples)

| Sample | Induction Time (hrs) |
|---|---|
| No preservative | 6 |
| 0.01% EDTA | 176 |
| 0.5% Rhodotorulic Acid | >250 |
| 0.25% Rhodotorulic Acid | >250 |
| 4% Lactobionic Acid | 109 |
| 4% Lactobionic Acid + 0.5% Rhodotorulic Acid | >250 |
| 2% Citric Acid | 172 |
| 2% Citric Acid + 0.5% Rhodotorulic Acid | >250 |
| 1% Lactic Acid | 177 |
| 1% Lactic Acid + 0.5% Rhodotorulic Acid | >250 |
| 0.3% Acetic Acid | 85 |
| 0.3% Acetic Acid + 0.5% Rhodotorulic Acid | >250 |

Because of experimental limitations, it is not possible to quantify the full increase in oxidative stability (i.e., the induction time in excess of 250 hours) provided by the present invention with soybean oil. It is expected, however, that the use of the present invention with soybean oil would provide similar improvements as observed with fish and flax oils.

EXAMPLE 2

Rhodotorulic acid and acetic acid were tested in a food product (i.e., mayonnaise) to determine applicability of results described in the previous example. Three preparations of mayonnaise were prepared: (1) no added preservative, (2) 0.25 percent rhodotorulic acid, and (3) 0.01 percent EDTA (the maximum amount currently allowed in the United States). The mayonnaise preparation contained about 0.4 percent acetic acid. The samples were held for sensory analysis (i.e., detection of oil oxidation flavors) at about 70° F. for the about 8 months. The rhodotorulic acid-containing sample developed only minimal oxidation flavors (similar to EDTA stabilized samples), whereas the sample without any preservative developed significant oxidation flavors after just two months of storage.

While the invention has been particularly described with specific reference to particular process and product embodiments, it will be appreciated that various alterations and modifications may be based on the present disclosure, and are intended to be within the spirit and scope of the present invention as defined by the following claims.

What is claimed is:

1. A method for retarding oxidation of a lipid in a lipid-containing food product, said method comprising adding an effective amount of an antioxidant composition (1) to the lipid before forming the lipid-containing food product or (2) to the lipid containing-food product, wherein the antioxidant composition comprises effective amounts of a siderophore and an edible organic acid to provide significantly improved oxidation stability to the lipid; wherein the siderophore is water soluble and wherein the antioxidant composition including the siderophore remains within the lipid-containing food product.

2. The method as defined in claim 1, wherein the antioxidant composition consists essentially of the siderophore and the edible organic acid.

3. The method as defined in claim 1, wherein the siderophore is selected from the group consisting of rhodotorulic acid, dimerumic acid, enterobactin, pseudobactin, nocardamine, schizokinen, parabeactin, azotochelin, mycobactin, pyochelin, pyoverdin, ferrichrysin, ferrishrome, coprogen, desferoxamine, salts thereof, and mixtures thereof and wherein the edible organic acid is selected from the group consisting of lactobionic acid, lactic acid, citric acid, acetic acid, malic acid, gluconic acid, ascorbic acid, tartaric acid, fumaric acid, succinic acid, and mixtures thereof.

4. The method as defined in claim 2, wherein the siderophore is selected from the group consisting of rhodotorulic acid, dimerumic acid, enterobactin, pseudobactin, nocardamine, schizokinen, parabeactin, azotochelin, mycobactin, pyochelin, pyoverdin, ferrichrysin, ferrishrome, coprogen, desferoxamine, salts thereof, and mixtures thereof and wherein the edible organic acid is selected from the group consisting of lactobionic acid, lactic acid, citric acid, acetic acid, malic acid, gluconic acid, ascorbic acid, tartaric acid, fumaric acid, succinic acid, and mixtures thereof.

5. The method as defined in claim 1, wherein the siderophore is rhodotorulic acid.

6. The method as defined in claim 2, wherein the siderophore is rhodotorulic acid.

7. The method as defined in claim 5, wherein the edible organic acid is lactobionic acid.

8. The method as defined in claim 6, wherein the edible organic acid is lactobionic acid.

9. The method as defined in claim 3, wherein the antioxidant composition contains about 5 to about 25 percent of the siderophore and about 75 to about 95 of the edible organic acid.

10. The method as defined in claim 4, wherein the antioxidant composition contains about 5 to about 25 percent of the siderophore and about 75 to about 95 of the edible organic acid.

11. The method as defined in claim 1, wherein the lipid-containing food product is an emulsified food product.

12. The method as defined in claim 2, wherein the lipid-containing food product is an emulsified food product.

13. The method as defined in claim 1, wherein the lipid is selected from the group consisting of fish oil, omega-3- or omega-6-containing oil, flax seed oil, soybean oil, olive oil, corn oil, peanut oil, sesame seed oil, grape seed oil, almond oil, cashew oil, other nut and seed oils, partially saturated oils, butter fat, essential oils, and mixtures thereof.

14. The method as defined in claim 2, wherein the lipid is selected from the group consisting of fish oil, omega-3- or omega-6-containing oil, flax seed oil, soybean oil, olive oil, corn oil, peanut oil, sesame seed oil, grape seed oil, almond oil, cashew oil, other nut and seed oils, partially saturated oils, butter fat, essential oils, and mixtures thereof.

15. A method for retarding oxidation of a lipid, said method comprising adding an effective amount of an antioxidant composition to the lipid, wherein the antioxidant composition comprises effective amounts of a siderophore and an edible organic acid to provide significantly improved oxidation stability to the lipid; wherein the siderophore is in a water soluble form in the lipid; and wherein the antioxidant composition remains within the lipid.

16. The method as defined in claim 15, wherein the antioxidant composition consists essentially of the siderophore and the edible organic acid.

17. The method as defined in claim 15, wherein the siderophore is selected from the group consisting of rhodotorulic acid, dimerumic acid, enterobactin, pseudobactin, nocardamine, schizokinen, parabeactin, azotochelin, mycobactin, pyochelin, pyoverdin, ferrichrysin, ferrishrome, coprogen, desferoxamine, salts thereof, and mixtures thereof and wherein the edible organic acid is selected from the group consisting of lactobionic acid, lactic acid, citric acid, acetic acid, malic acid, gluconic acid, ascorbic acid, tartaric acid, fumaric acid, succinic acid, and mixtures thereof.

18. The method as defined in claim 16, wherein the siderophore is selected from the group consisting of rhodotorulic acid, dimerumic acid, enterobactin, pseudobactin, nocardamine, schizokinen, parabeactin, azotochelin, mycobactin, pyochelin, pyoverdin, ferrichrysin, ferrishrome, coprogen, desferoxamine, salts thereof, and mixtures thereof and wherein the edible organic acid is selected from the group consisting of lactobionic acid, lactic acid, citric acid, acetic acid, malic acid, gluconic acid, ascorbic acid, tartaric acid, fumaric acid, succinic acid, and mixtures thereof.

19. The method as defined in claim 15, wherein the siderophore is rhodotorulic acid and the edible organic acid is lactobionic acid.

20. The method as defined in claim 16, wherein the siderophore is rhodotorulic acid and the edible organic acid is lactobionic acid.

21. The method as defined in claim 15, wherein the antioxidant composition contains about 5 to about 25 percent of the siderophore and about 75 to about 95 of the edible organic acid.

22. The method as defined in claim 16, wherein the antioxidant composition contains about 5 to about 25 percent of the siderophore and about 75 to about 95 of the edible organic acid.

23. The method as defined in claim 21, wherein about 0.01 to about 10 percent of the antioxidant composition is added to the lipid.

24. The method as defined in claim 22, wherein about 0.01 to about 10 percent of the antioxidant composition is added to the lipid.

25. A method for retarding oxidation of a lipid in a lipid-containing food product, said method comprising providing a food product containing a lipid; adding an effective amount of an antioxidant composition (1) to the lipid before forming the lipid-containing food product or (2) to the lipid-containing food product; the antioxidant composition including effective amounts of a siderophore and an edible organic acid to provide significantly improved oxidation stability to the lipid; and wherein the antioxidant composition including the siderophore remains within the lipid-containing food product.

26. A method for retarding oxidation of a lipid, said method comprising providing a lipid; adding an effective amount of an antioxidant composition to the lipid; wherein the antioxidant composition comprises effective amounts of a siderophore and an edible organic acid to provide significantly improved oxidation stability to the lipid; and wherein the antioxidant composition including the siderophore remains within the lipid.

\* \* \* \* \*

UNITED STATES PATENT AND TRADEMARK OFFICE
CERTIFICATE OF CORRECTION

PATENT NO. : 7,595,073 B2  
APPLICATION NO. : 10/376030  
DATED : September 29, 2009  
INVENTOR(S) : Cheryl Baldwin et al.

Page 1 of 1

It is certified that error appears in the above-identified patent and that said Letters Patent is hereby corrected as shown below:

Column 8, line 36, in claim 1, after "soluble" insert -- ; --.

Column 8, line 46, in claim 3, delete "ferrishrome," and insert -- ferrichrome, --.

Column 8, line 56, in claim 4, delete "ferrishrome," and insert -- ferrichrome, --.

Column 9, line 42, in claim 17, delete "ferrishrome," and insert -- ferrichrome, --.

Column 10, line 3, in claim 18, delete "ferrishrome," and insert -- ferrichrome, --.

Signed and Sealed this

Fifteenth Day of December, 2009

David J. Kappos  
*Director of the United States Patent and Trademark Office*

UNITED STATES PATENT AND TRADEMARK OFFICE
CERTIFICATE OF CORRECTION

PATENT NO. : 7,595,073 B2  Page 1 of 1
APPLICATION NO. : 10/376030
DATED : September 29, 2009
INVENTOR(S) : Baldwin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 801 days.

Signed and Sealed this

Twenty-eighth Day of September, 2010

David J. Kappos
*Director of the United States Patent and Trademark Office*